(12) United States Patent
Nakao

(10) Patent No.: US 10,373,305 B2
(45) Date of Patent: Aug. 6, 2019

(54) POSITIONING METHOD FOR SEARCHING A PREVIOUSLY REGISTERED STANDARD PATTERN OUT OF AN INSPECTION TARGET IMAGE

(71) Applicant: Keyence Corporation, Osaka (JP)

(72) Inventor: Masashi Nakao, Osaka (JP)

(73) Assignee: Keyence Corporation, Osaka (JP)

( * ) Notice: Subject to any disclaimer, the term of this patent is extended or adjusted under 35 U.S.C. 154(b) by 204 days.

(21) Appl. No.: 15/285,499

(22) Filed: Oct. 5, 2016

(65) Prior Publication Data

US 2017/0148154 A1 May 25, 2017

(30) Foreign Application Priority Data

Nov. 24, 2015 (JP) ................................. 2015-228728

(51) Int. Cl.
*G06K 9/00* (2006.01)
*G06T 7/00* (2017.01)
*G06T 7/73* (2017.01)

(52) U.S. Cl.
CPC .............. *G06T 7/0004* (2013.01); *G06T 7/74* (2017.01); *G06T 2200/24* (2013.01); *G06T 2207/10004* (2013.01); *G06T 2207/30164* (2013.01)

(58) Field of Classification Search
None
See application file for complete search history.

(56) References Cited

U.S. PATENT DOCUMENTS

| 8,150,213 | B2 | 4/2012 | Kido |
| 8,155,473 | B2 | 4/2012 | Kido |
| 8,355,590 | B2 | 1/2013 | Kido |
| 8,401,305 | B2 | 3/2013 | Kido |
| 8,406,527 | B2 | 3/2013 | Kido |
| 2017/0148153 | A1 | 5/2017 | Nakao |

FOREIGN PATENT DOCUMENTS

JP 2010-067246 A 3/2010

*Primary Examiner* — Atiba O Fitzpatrick
(74) *Attorney, Agent, or Firm* — Kilyk & Bowersox, P.L.L.C.

(57) ABSTRACT

A feature portion desired by a user out of an inspection target image is accurately positioned. A standard region is set so as to surround a standard pattern in a standard image of a product to be a standard for an inspection target. A sorting region, which is a region for sorting a plurality of candidates similar to the standard pattern, is set in the inspection image. The standard pattern is searched from the inspection image, to extract a plurality of candidates similar to the standard pattern. The sorting region is disposed with respect to each of the plurality of candidates for the standard pattern, extracted in the extraction step, to sort a candidate for the standard pattern based on an evaluation value of the sorting region disposed with respect to each of the plurality of candidates for the standard pattern.

13 Claims, 13 Drawing Sheets

FIG. 4A
FIG. 4B
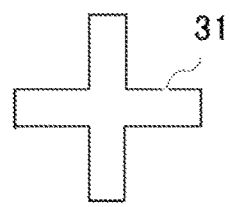
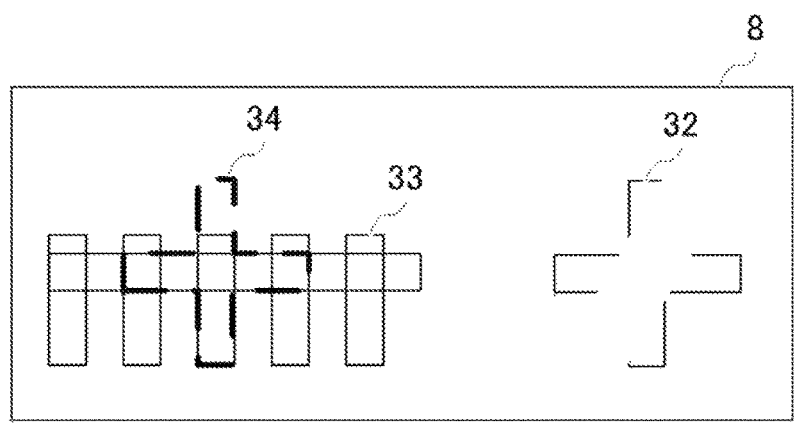
FIG. 4C
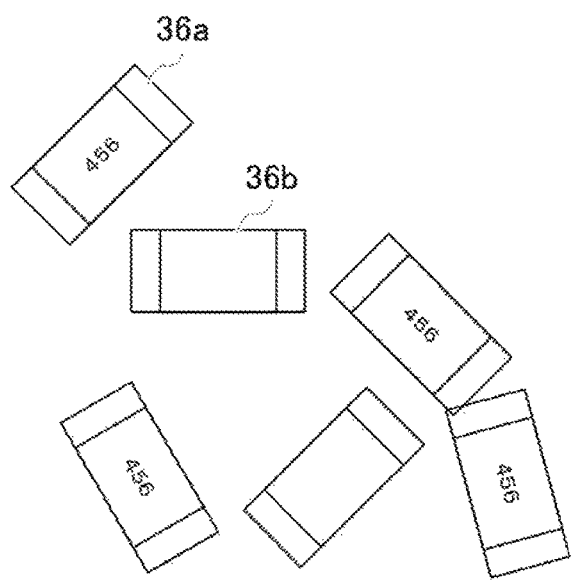

POSITIONING METHOD FOR SEARCHING A PREVIOUSLY REGISTERED STANDARD PATTERN OUT OF AN INSPECTION TARGET IMAGE

CROSS-REFERENCE TO RELATED APPLICATIONS

The present application claims foreign priority based on Japanese Patent Application No. 2015-228728, filed Nov. 24, 2015, the contents of which is incorporated herein by reference.

BACKGROUND OF THE INVENTION

1. Field of the Invention

The present invention relates to a positioning method for capturing an image of a product to position the product, a positioning apparatus, a program, and a computer readable recording medium.

2. Description of Related Art

Visual inspection is performed for making a pass/fail determination on a product manufactured in a factory. In the visual inspection, an inspection target is photographed by a camera to acquire an inspection target image. From a standard image obtained by capturing an image of a non-defective product to be a standard for the product, a region is set so as to surround the non-defective product. A feature (standard pattern, etc.) of the non-defective product is extracted from the region, and a candidate similar to this feature is searched in an inspection target image. The visual inspection is then performed on the candidate found by the search. Edge information extracted from the standard image is often used in order to find the candidate (Unexamined Japanese Patent Publication No. 2010-067246).

There may be a large number of candidates similar to the standard pattern in the inspection target image. Some candidates may be simply similar as images, and thus an extracted candidate may not be a target of the visual inspection. Also in an application other than the visual inspection, a candidate may need to be sorted.

There is, for example, a request for sorting a product, easy for robot-picking by a robot hand, out of a plurality of products. For example, a product with an obstacle present therearound and likely to fail in robot-picking is desirably removed from the candidates. Further, in an application where an alignment mark provided on a product is detected to position the product, it is necessary to find a way not to erroneously detect a portion having a similar shape to that of the alignment mark. Accordingly, it is an object of the present invention to accurately position a feature portion desired by a user out of an inspection target image.

SUMMARY OF THE INVENTION

The present invention, for example, provides a positioning method for searching a previously registered standard pattern from an inspection target image obtained by capturing an image of an inspection target, to position the standard pattern with respect to the inspection target image. The method includes: a setting step of displaying a standard image of a product to be a standard for the inspection target, to set a first region so as to surround the standard pattern in the standard image, and setting a second region that is a region for sorting a plurality of candidates similar to the standard pattern in the inspection target image; an extraction step of searching the standard pattern from the inspection target image to extract a plurality of candidates similar to the standard pattern; a sorting step of disposing the second region with respect to each of the plurality of candidates for the standard pattern, extracted in the extraction step, to sort a candidate for the standard pattern based on an evaluation value of the second region disposed with respect to each of the plurality of candidates for the standard pattern; and an output step of outputting the candidate for the standard pattern sorted in the sorting step.

According to the present invention, it is possible to accurately position a feature portion desired by a user out of an inspection target image.

BRIEF DESCRIPTION OF THE DRAWINGS

FIGS. 4A to 4C are views for explaining the relation between a standard pattern and candidates;

DETAILED DESCRIPTION OF PREFERRED EMBODIMENTS

Hereinafter, one embodiment of the present invention will be shown. Individual embodiments described below may be useful for understanding a variety of concepts such as a superordinate concept, an intermediate concept, and a subordinate concept of the present invention. Further, a technical range of the present invention is defined by the claims, and is not limited by the following individual embodiments.

Figure 1:
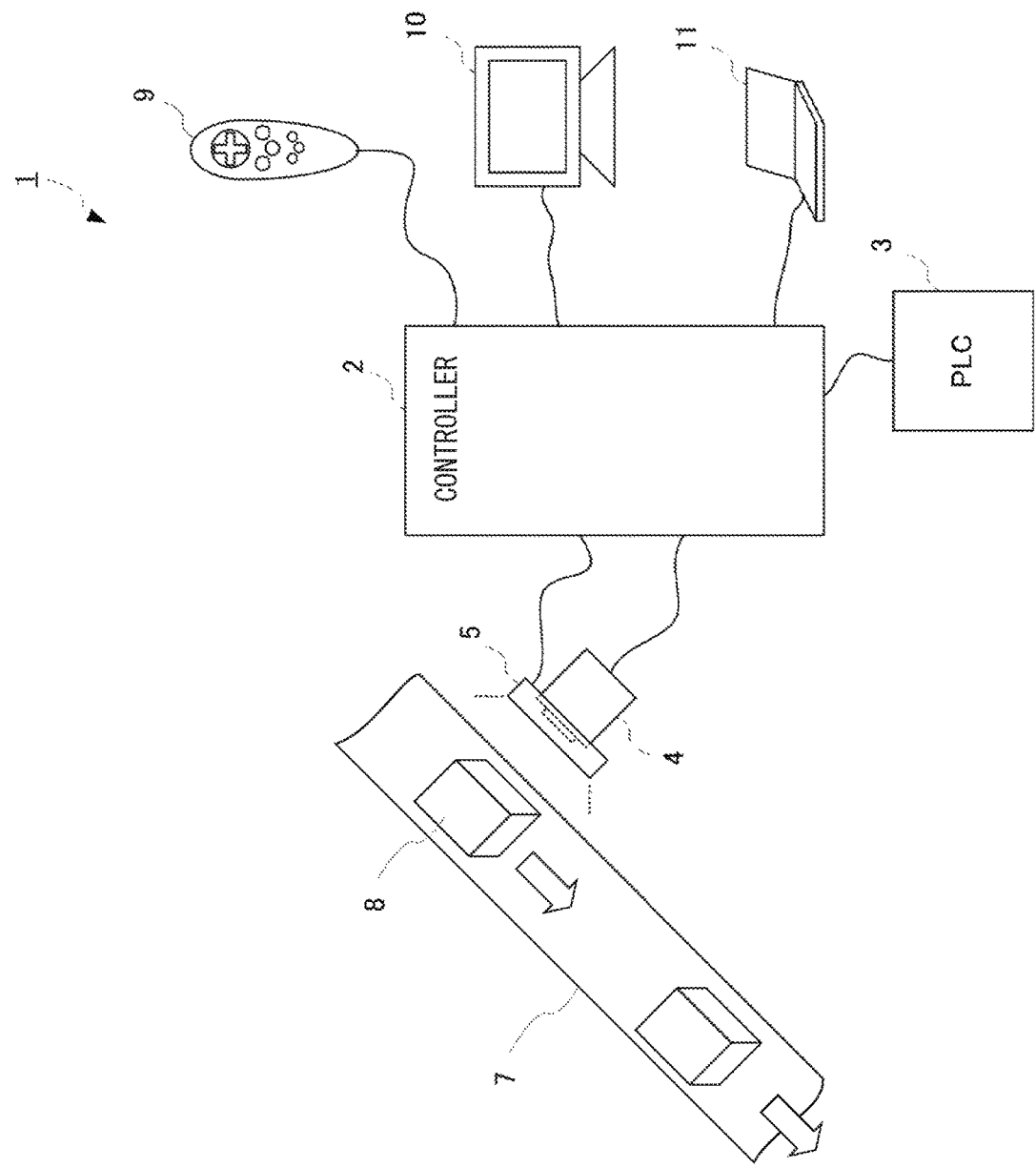
FIG. 1 is a schematic view showing a simple overview of a visual inspection apparatus.

FIG. 1 is a schematic view showing a simple overview of a visual inspection apparatus 1. The visual inspection apparatus 1 includes a controller 2, a programmable logic controller (PLC) 3, a camera 4, an illuminating device 5, a console 9, a monitor 10, and a program creation support device 11. A conveyance device 7, such as a belt conveyor, controlled by the PLC 3 carries an inspection target 8. The camera 4 captures an image of the inspection target 8 illuminated by the illuminating device 5. The inspection target 8 may also be referred to as a workpiece. For example, in accordance with an order from the PLC 3, the controller 2 switches an illuminating condition for the illuminating device 5, or causes the camera 4 to perform imaging.

The controller 2 performs a variety of measurement processing such as edge detection and area calculation from the image of the inspection target 8. For example, the controller 2 performs image processing by use of image data obtained from the camera 4 and outputs a determination signal, as a signal indicating a determination result such as pass/fail of the inspection target 8, to externally connected control equipment such as the PLC 3.

The camera 4 is provided with a camera module having an imaging element for capturing the image of the inspection target 8. As the imaging element, for example, a CMOS (Complementary Metal Oxide Semiconductor) or a CCD (Charge-Coupled Device) can be used. The camera 4 captures the image of the inspection target 8 based on a control signal inputted from the PLC 3, such as an imaging trigger signal to define the timing for fetching image data from the camera 4.

The monitor 10 is a display device such as a liquid crystal panel or a light-emitting panel. It displays the captured image of the inspection target 8, and a result of measurement processing performed using the image data. The monitor 10 may display an image acquired from a non-defective product, such as a reference image to be used for creating comparison data (standard image) for pattern matching. Note that the standard image may be referred to as a model image.

The console 9 is an input device for the user to perform a variety of operation on the monitor 10 (the console 9 can be omitted when the monitor 10 is a touch panel). The console 9 selects each menu item and sets a parameter value on the monitor 10. The console 9 is an example of a pointing device. By viewing the monitor 10, the user can confirm an operating state of the controller 2 that is running. By operating the console 9 while viewing the monitor 10, the user can perform a variety of setting and edition according to the need.

The illuminating device 5 is a device for illuminating the inspection target 8. As the illuminating device 5, there can be employed illuminating devices for performing a variety of illumination, such as coaxial vertical illumination for emphasizing a gloss, low-angle illumination for emphasizing an edge of a scratch or a mark, black-light illumination for throwing black light, surface illumination (trans-illumination for observing transmitted light or a shade of an inspection target), and dome illumination for applying diffused light from all directions. Particularly, the coaxial vertical illumination is an illumination technique of illuminating the entire visual field in a substantially uniform manner. This illumination has an advantage of obtaining almost the same effect as that of an illumination technique of receiving regularly reflected light from the inspection target 8, by disposing the camera 4 and the illuminating device 5 in a V-shape. Further, the low-angle illumination is an illumination technique of disposing a light projecting element such as an LED in a ring shape and illuminating the surface of the inspection target 8 with light at a shallow angle from all circumferential directions. The light applied on the surface of the inspection target 8 is not reflected in a direction to the camera 4, and only the light reflected at an edge portion of the mark or the scratch is received. That is, with the angle of illumination very shallow, the reflection is weak on the gloss surface, and the reflection is strong only at the edge of a tiny scratch on the inspection target 8, whereby clear contrast is obtained.

The program creation support device 11 is a computer (PC) for creating a control program to be run by the controller 2. The control program has a plurality of measurement processing modules for performing different types of measurement concerning the visual inspection as described below. The controller 2 calls and runs a variety of measurement processing modules in accordance with a set sequence. The program creation support device 11 is connected with the controller 2 through a communication cable or a communication network. The setting information such as the control program and the parameter value generated on the program creation support device 11 is transmitted to the controller 2 through the communication cable or the like. In reverse, the setting information, such as the control program and the parameter value, may be fetched from the controller 2, to be re-edited by the program creation support device 11.

In a factory, a plurality of inspection targets 8 flow on a line of the conveyance device 7 such as a conveyor. The controller 2 captures the image of the inspection target 8 by the camera 4 installed above (or lateral to, or below) the inspection target 8, and compares the captured image with a reference image (e.g., a captured image of a non-defective product) or a model image created from the reference image, to determine whether or not a scratch, a defect, or the like exists on the inspection target 8. When it is determined that a scratch, a defect, or the like exists on the inspection target 8, a fail determination is made. On the other hand, when it is determined that a scratch, a defect, or the like does not exist on the inspection target 8, a pass determination is made. As thus described, the visual inspection apparatus 1 makes a pass/fail determination on appearance of the inspection target 8 by use of the captured image of the inspection target 8.

When the visual inspection is to be performed on the inspection target 8, the user needs to set details (parameter values, etc.) of a variety of parameters for use in the inspection. The parameters, for example, include an imaging parameter for defining an imaging condition such as a shutter speed, an illuminating parameter for defining an illuminating condition such as an illuminance, a measurement processing parameter (so-called inspection parameter) for defining an inspection condition showing what kind of inspection is to be performed, and some other parameter. In the visual inspection apparatus 1, details of the variety of parameters are set before the pass/fail determination is made.

The visual inspection apparatus 1 has: a mode for actually performing the visual inspection on the inspection target 8 flowing one after another on the line of the conveyance device 7, namely, an operating mode (Run mode) for actually making the pass/fail determination on the inspection target 8; and a setting mode (Non-Run mode) for setting details of a variety of parameters for use in the inspection. The visual inspection apparatus 1 has a mode switching unit for switching these modes. The user sets (adjusts) an optimum parameter value for each of a variety of parameters in the setting mode before the pass/fail determination is repeatedly made on a plurality of inspection targets 8 flowing on the line of the conveyance device 7 in the operating mode. Basically, default values are set for a variety of parameters. When the user determines the default value as optimum, adjustment of the parameter value is not particularly required. However, in reality, when the default value remains unchanged, a determination result desired by the user may not be obtained due to a surrounding illuminating environment, the installed position of the camera 4, postural deviation of the camera 4, a difference in focus adjustment, or the like. Accordingly, in the setting mode, the mode can be switched from the operating mode to the setting mode on the monitor 10 or the program creation support device 11 of the controller 2, to edit details of a variety of parameters.

<Hardware Configuration of Visual Inspection Apparatus 1>

Figure 2:
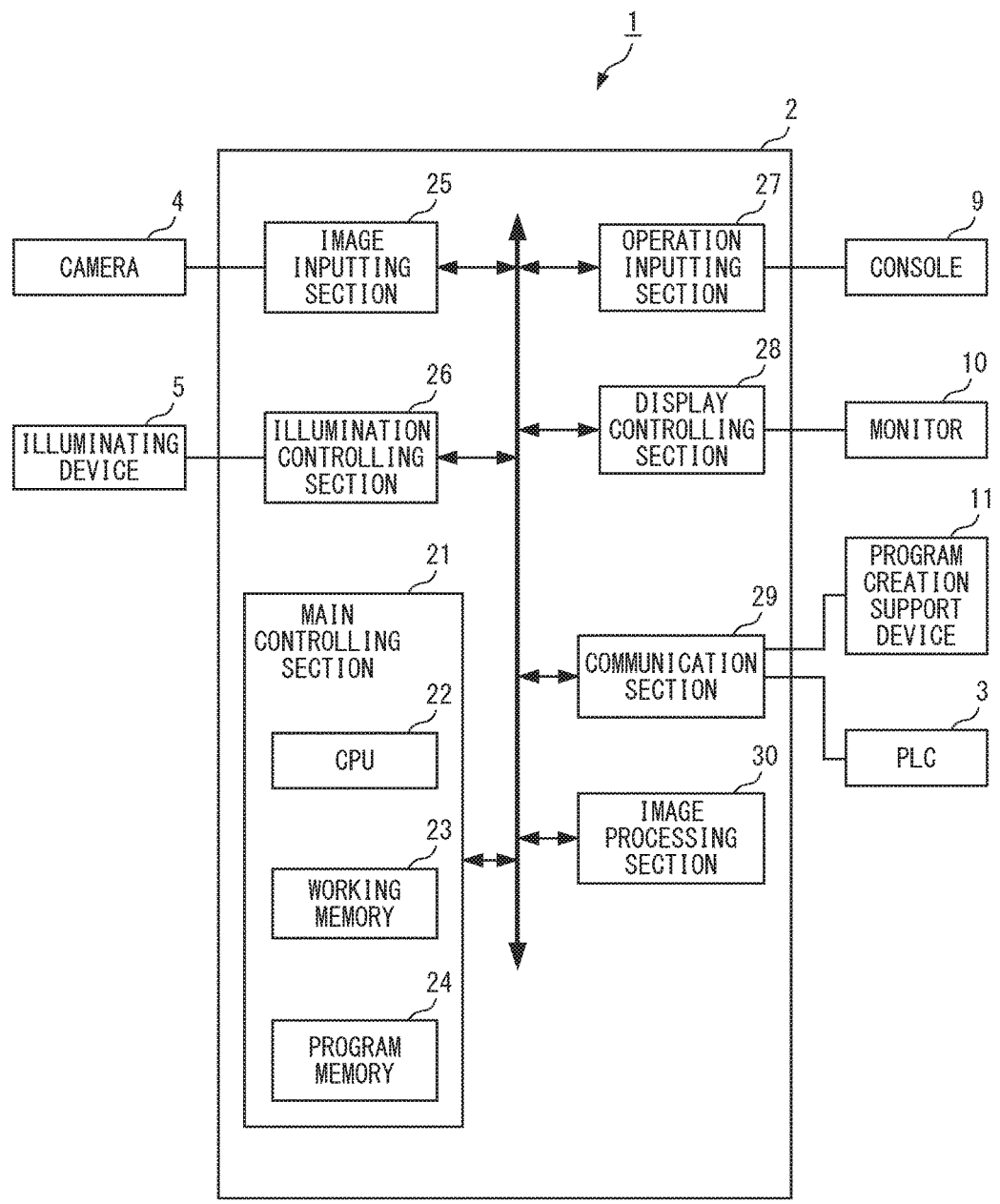
FIG. 2 is a diagram showing an example of a hardware configuration of the visual inspection apparatus.

FIG. 2 is a diagram showing an example of a hardware configuration of the visual inspection apparatus 1. A main control section 21 controls each section of the hardware while performing numeric calculation and information processing based on a variety of programs. For example, the main control section 21 includes: a CPU 22 as an intermediate operation processing device; a working memory 23 such as a RAM which functions as a working area at the time of running a variety of programs; and a program memory 24 such as a ROM, a flash ROM or an EEPROM which stores a startup program, an initialization program, and the like. An illumination controlling section 26 transmits an illumination control signal to the illuminating device 5 based on an order from the CPU 22 of the main control section 21 or from the PLC 3.

An image inputting section 25 is made up of an ASIC (Application Specific Integrated Circuit), which fetches image data acquired by imaging by the camera 4, and the like. The image inputting section 25 may include a frame buffer for buffering image data. Specifically, when receiving an imaging command for the camera 4 from the CPU 22, the image inputting section 25 transmits an image data fetching signal to the camera 4. After the imaging by the camera 4, the image inputting section 25 fetches image data obtained by the imaging. The fetched image data is once buffered (cached).

An operation inputting section 27 receives an input of an operation signal from the console 9. The operation inputting section 27 functions as an interface (I/F) for receiving an operation signal that is outputted by the console 9 in accordance with the user's operation.

The monitor 10 displays details of the user's operation performed using the console 9. Specifically, by operating the console 9, the user can do a variety of things on the monitor 10, such as editing a control program for image processing, editing a parameter value for each measurement processing module, setting imaging conditions for the camera 4, registering a characteristic portion in a reference image as a standard image, and performing search in a search region to set a region matching with the standard image as an inspection region.

A display controlling section 28 is made up of a DSP for display which displays an image on the monitor 10, and the like. The display controlling section 28 may include a video memory such as a VRAM for temporarily storing image data at the time of displaying an image. Based on a display command transmitted from the CPU 22, the display controlling section 28 transmits a control signal for displaying a predetermined image (video image) on the monitor 10. For example, the display controlling section 28 transmits a control signal to the monitor 10 in order to display image data before measurement processing or after measurement processing. Further, the display controlling section 28 also transmits a control signal for displaying on the monitor 10 details of the user's operation performed using the console 9.

A communication section 29 is connected communicably with the external PLC 3 and program creation support device 11, and the like. For example, a sensor (photoelectric sensor, not shown, etc.) is installed on a manufacturing line in order to recognize the arrival timing of the inspection target 8, and is also connected to the PLC 3. The sensor outputs a trigger signal when detecting the inspection target 8. The communication section 29 functions as an interface (I/F) for receiving the trigger signal outputted from the PLC 3. The trigger signal is used as a control signal for causing the camera 4 to perform imaging. The communication section 29 also functions as an interface (I/F) for receiving a control program for the controller 2, and the like, transmitted from the program creation support device 11.

An image processing section 30 is made up of a DSP for calculation, which performs measurement processing such as edge detection and area calculation, and the like. The image processing section 30 may include a memory for storing image data for measurement processing. The image processing section 30 performs measurement processing on image data. Specifically, the image processing section 30 reads image data from a frame buffer of the image inputting section 25, to perform internal transmission to the memory in the image processing section 30. The image processing section 30 then reads the image data stored in the memory, to perform measurement processing.

The program memory 24 stores a control program for controlling each of the illumination controlling section 26, the image inputting section 25, the operation inputting section 27, the display controlling section 28, the communication section 29, and the image processing section 30, by use of a command of the CPU 22 and the like. Further, the control program transmitted from the program creation support device 11 is stored into the program memory 24.

When the CPU 22 receives the imaging trigger signal from the PLC 3 through the communication section 29, it transmits an imaging command to the image inputting section 25. Further, based on the control program, the CPU 22 transmits to the image processing section 30 a command that instructs image processing to be performed. As the device to generate the imaging trigger signal, the PLC 3 may not be used, but a trigger inputting sensor such as a photoelectric sensor may be directly connected to the communication section 29.

The hardware described above is communicably connected with each other through electric communication path (cable) such as a bus.

<Measurement Module (Image Processing Tool)>

Here, a measurement module for performing the visual inspection is referred to as an image processing tool. Note that the image processing tool may also be referred to as an inspection tool or a measurement tool. There are a variety of image processing tools, and main image processing tools include an edge position measuring tool, an edge angle measuring tool, an edge width measuring tool, an edge pitch measuring tool, an area measuring tool, a blob measuring tool, a pattern search measuring tool, a scratch measuring tool, and the like.

Edge position measuring tool: On the screen that displays the image of the inspection target 8, a window is set with respect to an inspection region having an edge position to be detected, and scanning is performed in an arbitrary direction in the set inspection region, to detect a plurality of edges (a place where the brightness changes from bright to dark or a place where the brightness changes from dark to bright). Specification of one edge from the plurality of detected edges is accepted, and a position of the accepted edge is then measured.

Edge angle measuring tool: In the inspection region accepted to be set, two segments are set to measure an angle of inclination of the inspection target 8 from the edge detected in each of the segments. As for the angle of inclination, a clockwise direction can be taken as positive, for example.

Edge width measuring tool: In the inspection region accepted to be set, scanning is performed in an arbitrary direction to detect a plurality of edges and measure a width between the plurality of detected edges.

Edge pitch measuring tool: In the inspection region accepted to be set, scanning is performed in an arbitrary direction to detect a plurality of edges. The maximum/minimum values and an average value of distances (angles) between the plurality of detected edges are measured.

Area measuring tool: Binarization processing is performed on the image of the inspection target 8 captured by the camera 4, to measure an area of a white region or a black region. For example, specification of the white region or the black region as a measurement target is accepted as a parameter, to measure the area of the white region or the black region.

Blob measuring tool: Binarization processing is performed on the image of the inspection target 8 captured by the camera 4, to a measure a number, an area, a centroid position, and the like as parameters with respect to a set (blob) of pixels with the same luminance value (255 or 0).

Pattern search measuring tool: An image pattern (model image) to be a comparison target is previously stored in a storage device, and a portion of the captured image of the inspection target 8, which is similar to the stored image pattern, is detected to measure a position, an angle of inclination, and a correlation value of the image pattern.

Scratch measuring tool: In the inspection region accepted to be set, a small region (segment) is moved to calculate an average concentration value of pixel values and determine a position with a concentration difference not smaller than a threshold as having a scratch.

Other than the above, there are tools such as: an OCR recognition tool for cutting out character information in the inspection region and checking it with dictionary data or the like to recognize a character string; a trend edge tool having a function of shifting a window (region) set on the screen and repeat edge detection in a position of each window; and a gradation tool having a function to measure an average, a deviation, and the like of gradations in the set window. The user can select a required image processing tool according to details of the inspection. Note that these image processing tools merely show typical functions and representative examples of the method for realizing the functions. An image processing tool corresponding to any image processing can be a target of the present invention.

<Basic Flow of Visual Inspection>

Figure 3:
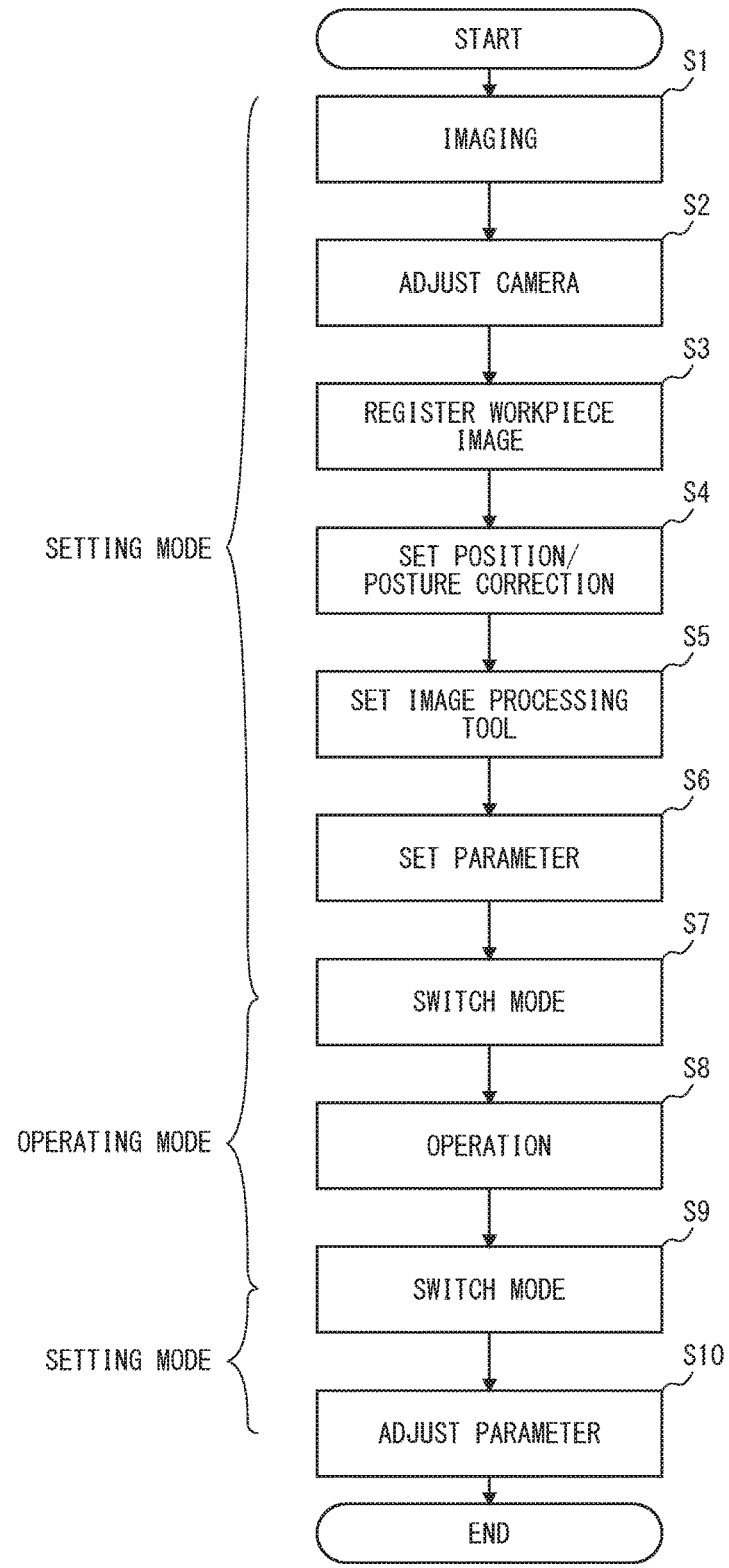
FIG. 3 is a flowchart showing a basic flow of visual inspection processing.

FIG. 3 is a flowchart showing a basic flow of visual inspection processing. The visual inspection processing is divided into a setting mode and an operating mode. The setting mode is a mode for setting a standard image, an inspection region, a search region, a detection point (hereinafter referred to as reference point), a reference line, and a threshold such as a tolerance, which are required for making the pass/fail determination on the inspection target 8. The operation mode is a mode for actually capturing the image of the inspection target 8 and performing image processing such as pattern matching to make the pass/fail determination. For appropriately setting parameters for inspection, it is common that the setting mode and the operating mode are repeatedly performed. Note that the visual inspection processing may also be performed by size measurement, an area tool, a scratch tool, or the like.

In S1, the CPU 22 transmits an imaging order to the camera 4 through the image inputting section 25, to cause the camera 4 to perform imaging. The CPU 22 displays image data acquired by the camera 4 on the monitor 10 through the display controlling section 28. By viewing the image displayed on the monitor 10, the user confirms the posture of the camera 4 and the illuminating state of the illuminating device 5.

In S2, the CPU 22 adjusts an exposure condition such as a shutter speed of the camera 4 based on an instruction inputted by the console 9. Note that the user may manually adjust the posture of the camera 4.

In S3, the CPU 22 transmits an imaging order to the camera 4 in order to fetch as a workpiece image the image of the inspection target 8 that is disposed in an imaging position of the conveyance device 7. Note that the workpiece image (basic image) may be the reference image that is stored in a nonvolatile memory and repeatedly used, or may be an image that is captured each time for creating the standard image. Here, the workpiece image is stored in the working memory 23. Note that the model image may be created from the reference image.

In S4, the CPU 22 performs setting processing for position/posture correction. In the image acquired by the camera 4, the position of the image of the inspection target 8 may be deviated from an ideal position.

Therefore, the CPU 22 acquires the position and posture (rotating angle) of the inspection target 8 from the image of the inspection target 8. The position and posture of the image processing tool (inspection tool) are corrected according to the acquired position, to correct the positional deviation. Note that the position/posture correction may be performed by the image processing section 30. As thus described, the position/posture correction is processing for matching the position and posture of the inspection tool with the position and posture of the image of the inspection target 8.

In S5, the CPU 22 sets a variety of inspection tools described above. For example, there are made a setting for which measurement is to be performed in the visual inspection, and settings for a search region, an inspection region, a reference point, and the like, which are required for performing the measurement.

In S6, the CPU 22 sets a parameter required in the visual inspection (e.g., inspection threshold such as tolerance) based on an instruction inputted by the console 9. In S7, the CPU 22 switches the mode from the setting mode to the operating mode.

In S8, the CPU 22 causes the camera 4 to capture the image of the inspection target 8 in accordance with an instruction from the PLC 3, and causes the image processing section 30 to perform pattern matching or the like. Based on its result, the CPU 22 makes the pass/fail determination, and outputs the determination result to the PLC 3 and to the monitor 10.

In S9, when the CPU 22 receives an input of a mode switching instruction from the console 9, it switches the mode from the operating mode to the setting mode. In S10, the CPU 22 re-sets a parameter based on an instruction inputted by the console 9.

<Basic Idea of Sorting Technique>

FIG. 4A shows a standard pattern 31 of an alignment mark provided on part of the inspection target 8. The standard pattern is a feature of an image extracted by image processing from a standard image (also referred to as a model image or a template image) obtained by capturing an image of a non-defective product of the inspection target 8. The alignment mark is used for positioning the inspection target 8 with respect to a processing machine so as to process the inspection target 8.

FIG. 4B shows an alignment mark 32 formed on the inspection target 8, and a similar shape 33 partially similar to the alignment mark 32. There are cases where the alignment mark 32 is scratched, or where an image of the alignment mark 32 is unclearly taken at the time of capturing an image of the inspection target 8, due to an influence of illuminating light. In such cases, part of the similar shape 33 may be detected as a candidate for the standard pattern 31. Further, in the case of selecting the candidate based on an evaluation value obtained by an edge matching degree, so long as an edge similar to the standard pattern 31 is present in the inspection image, the evaluation value with respect to the standard pattern 31 becomes undesirably high. That is, even when another edge continuing to an edge similar to the standard pattern 31 is present in the inspection image, the evaluation value becomes undesirably high in the technique relying on the evaluation value. When a scratch, a mark, or the like inside the standard pattern 31 does not form a contour on the standard pattern, or when the mark or the like, even if forming a contour, is relatively small as compared with the standard pattern, it may not be possible to sort out the candidate for the standard pattern 31 by the technique relying on the evaluation value of the contour. There has been described the example of the evaluation value being such a value as to become high when an edge constituting the standard pattern is compared with an edge on the inspection image and an edge corresponding to the edge constituting the standard pattern is present on the inspection image. However, a variety of techniques can be employed as a technique of calculating the evaluation value. For example, a correlation value obtained by normalized correlation or the like may be employed. A technique of focusing attention on normalized correlation of an image has an advantage in that a correlation value becomes low when there is a portion not present in the standard image. However, this technique has the same problem as the edge evaluation in the following respect: even with the use of the correlation value obtained by the normalized correlation, when the inspection image is unclear or when the mark or the like is relatively small as compared with the standard pattern, the presence or absence of the mark or the scratch cannot be discriminated just by the correlation value. Note that an evaluation value representing a similarity to the standard pattern, including the evaluation value obtained by the edge matching degree and the correlation value obtained by the normalized correlation, is simply referred to as a correlation value.

FIG. 4C shows an example of only sorting a face-up workpiece (semiconductor chip 36a) out of a plurality of workpieces (semiconductor chips 36a, 36b). There is a request for mounting a small electronic component face-up at the time of mounting the small electronic component on a substrate. When the electronic component is searched based on an external feature of the standard pattern as has been done, a face-down electronic component as well as a face-up electronic component is undesirably detected as the candidate.

Figure 5A:
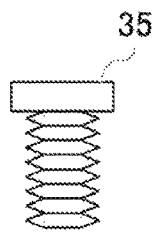
FIGS. 5A to 5C are views for explaining the relation between a standard pattern and candidates.
Figure 5B:
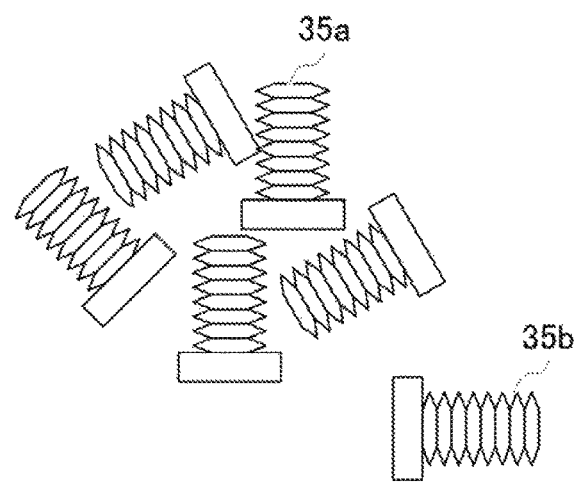
Figure 5C:
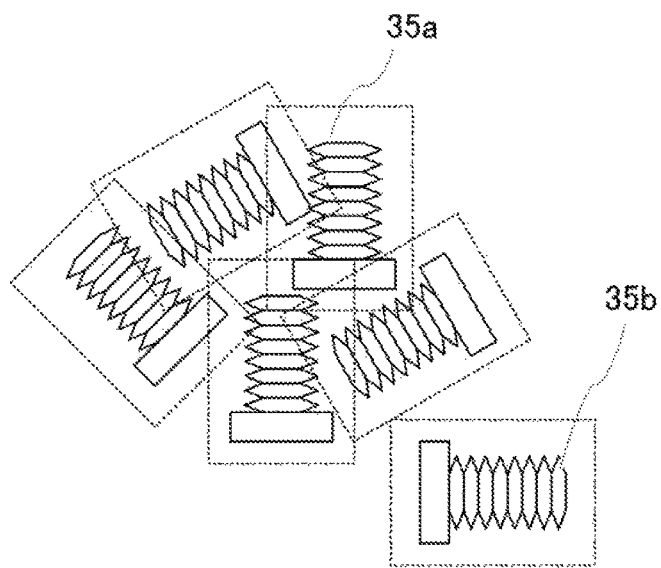

FIG. 5A shows a screw 35 being a target for robot-picking by a robot hand. By photographing the screw 35, a standard pattern of the screw 35 is extracted. FIG. 5B show a plurality of screws 35a, 35b having been carried by the belt conveyor or the like. For grasping the screw 35 by the robot hand, no obstacle is desirably present around the screw 35. For example, since other screws are present around the screw 35a, performing the robot-picking on the screw 35a by the robot is not easy. Hence it is desirable to detect as a candidate a screw 35b with no obstacle present therearound. However, when search is performed using the standard pattern extracted from the screw 35, as shown in FIG. 5C, all screws 35 similar to the standard pattern are undesirably extracted as candidates.

As described above, in each of a variety of applications such as the visual inspection and robot-picking, there is required a technique of sorting a workpiece more suitable for a purpose of the application among a plurality of candidates similar to the standard pattern.

In the present embodiment, a sorting region is set with respect to the standard image in order to sort a desired candidate out of a plurality of candidates similar to the standard pattern. Further, a standard region for extracting the standard pattern is also set in the standard image. Note that the positional relation between the standard pattern and the sorting region is set using the standard image, and this positional relation is also held in the inspection target image. Even scaling processing is intervened, these positional relations are held.

Figure 6A:
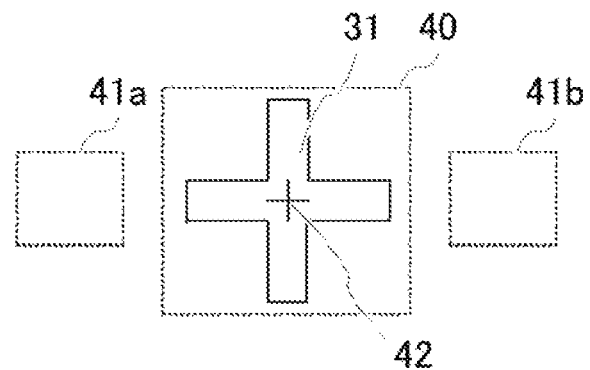
FIGS. 6A to 6C are views for explaining examples of a standard region and a sorting region.

FIG. 6A shows a placement example of a standard region 40 for setting or extracting an outline (contour) of an alignment mark as the standard pattern 31, and sorting regions 41 for sorting a candidate for the standard pattern 31 in an inspection target image (inspection image). In this example, since a plurality of sorting regions 41 are provided, the sorting region 41 disposed on the left side of the standard region 40 is referred to as a sorting region 41a, and the sorting region 41 disposed on the right side of the standard region 40 is referred to as a sorting region 41b. As thus described, characters a, b, and the like are just expediential characters that are provided for distinguishing a plurality of sorting regions 41. When a matter in common among the plurality of sorting regions 41 is to be described, the characters a, b, and the like are omitted. The standard region 40 and the sorting region 41 are set with respect to the standard image, and a relative positional relation between the standard region 40 and the sorting region 41 is held. Note that a detecting point 42 is set in the standard image.

Figure 6B:
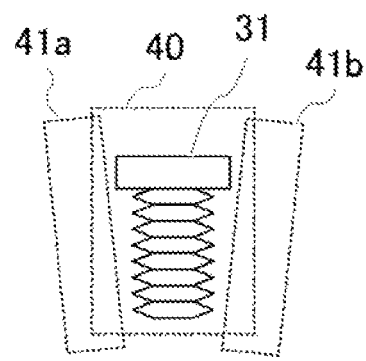

FIG. 6B shows a placement example of the standard region 40 for setting or extracting a contour of the screw 35 as the standard pattern 31, and sorting regions 41 for sorting a candidate for the standard pattern 31 in the inspection image. Since the robot picking is assumed to be performed on the screw 35 in this example, the sorting regions 41a, 41b are provided in a working range for the robot-picking.

Figure 6C:
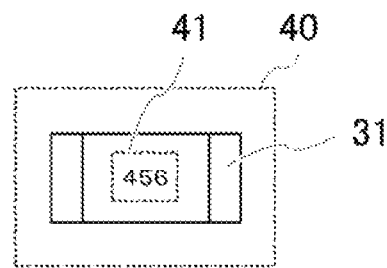

FIG. 6C shows a placement example of the standard region 40 for setting or extracting a contour of the semiconductor chip 36 as the standard pattern 31, and a sorting region 41 for sorting a candidate for the standard pattern 31 in the inspection image. Since an application for mounting the semiconductor chip 36 face-up is assumed in this example, the sorting region 41 for sorting the face-up semiconductor chip 36a and the face-down semiconductor chip 36b is provided. In this example, characters such as an identification number is provided on the front surface of the semiconductor chip 36, and no characters are provided on the rear surface thereof.

Therefore, when the sorting region 41 is set with respect to the characters of the front surface, the front and the rear of the semiconductor chip 36 can be distinguished.

Figure 7:
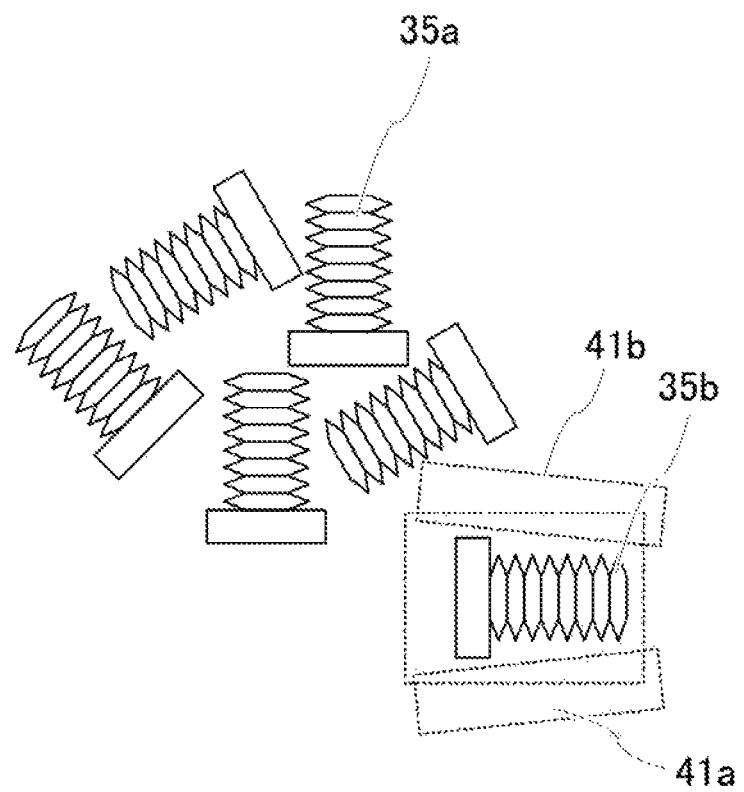
FIG. 7 is a view for explaining an example of the standard region and the sorting region.

FIG. 7 is a view showing an example of a result of sorting by use of the sorting regions. By using a contour feature, extracted from the standard region 40, as the standard pattern 31, a plurality of candidates similar to the standard pattern 31 are extracted as shown in FIG. 5C. Next, attention is focused on the two sorting regions 41a, 41b as shown in FIG. 6B. In this example, the two sorting regions 41a, 41b are both set as having no obstacle as a sorting condition. Of a plurality of candidates extracted from the inspection image, a feature of an image and the sorting condition in each of the two sorting regions 41a, 41b are compared. As a result, as shown in FIG. 7, the sorting regions 41a, 41b for the screw 35a and the like do not satisfy the sorting condition, and hence the screw 35a and the like are excluded from the candidates. The sorting regions 41a, 41b for the screw 35b satisfy the sorting condition, and hence the screw 35b is decided as a final candidate.

<Functions of CPU and Image Processing Section>

Figure 8:
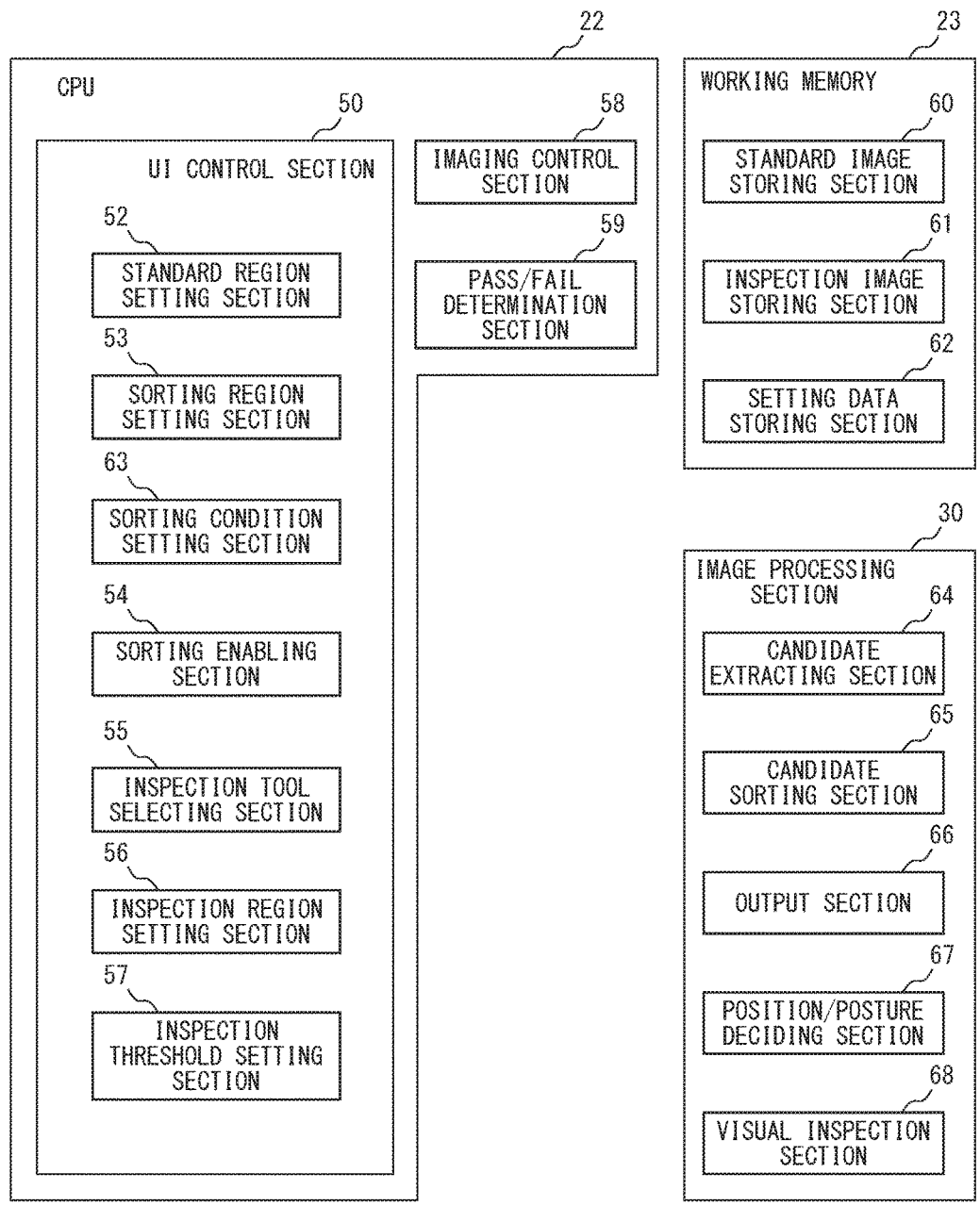
FIG. 8 is a diagram for explaining functions of a CPU and an image processing section.

FIG. 8 is a diagram showing an example of functions of the CPU 22 and the image processing section 30. The CPU 22 runs control programs stored in the program memory 24, to realize a variety of functions. Part or all of these functions may be realized by a logic circuit such as an ASIC or an FPGA.

Figure 9:
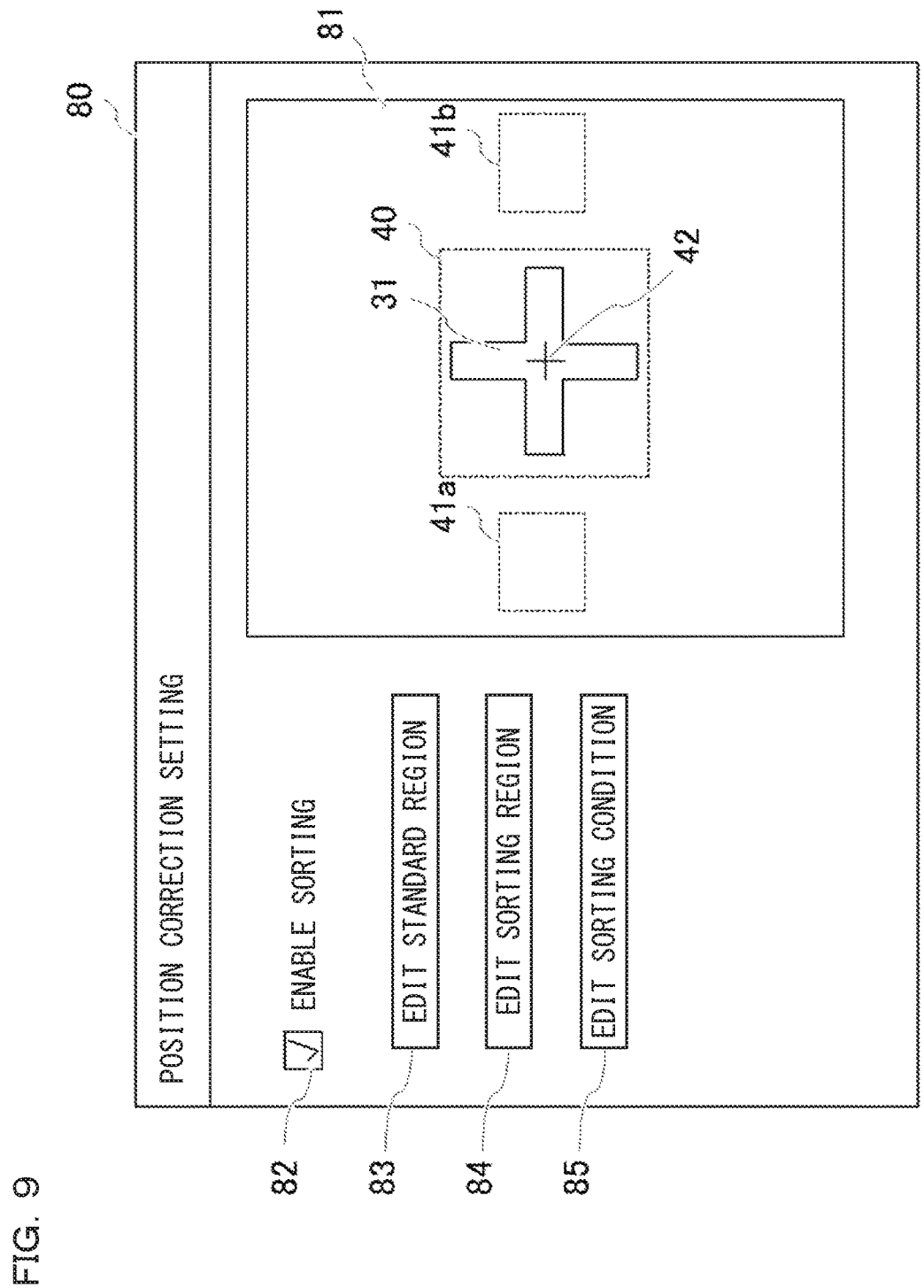
FIG. 9 is a view showing an example of a setting user interface.

A UI control section 50 controls a user interface (UI) for performing a variety of settings required in performing a variety of applications such as the visual inspection. The UI control section 50 accepts the user's instruction inputted from the console 9 or the like, and displays information on the monitor 10 through the display controlling section 28. For example, when a position correction setting is instructed through the console 9, the UI control section 50 displays on the monitor 10 a position correction setting UI 80 as shown in FIG. 9. The position correction setting UI 80 includes: a display region 81 for displaying a standard image, a check box 82 for enabling/disabling the sorting processing; an edition button 83 for editing the standard region 40; an edition button 84 for editing the sorting region 41; an edition button 85 for editing the sorting condition; and the like. When the check box 82 is checked, the sorting enabling section 54 stores, in the setting data storing section 62, information indicating that the sorting processing has been enabled. When the check box 82 is checked, the UI control section 50 may change the state of each of the edition button 84 for editing the sorting region 41 and the edition button 85 for editing the sorting condition from an inoperable state (graying out, etc.) to an operable state.

A standard region setting section 52 sets the standard region 40 with respect to the standard image displayed in the display region 81 in accordance with the user's instruction from the console 9. The standard region setting section 52 stores, in the setting data storing section 62, data indicating a position (e.g., coordinates of four vertexes, coordinates of a detecting point 42, etc.) of the standard region 40 in the standard image. Note that the image processing section 30 may extract a feature of the standard pattern 31 surrounded by the standard region 40, and store data indicating the feature in the setting data storing section 62. When a search technique without the need for extracting the feature of the standard pattern 31 is to be employed, the feature extracting processing performed in advance is omitted.

A sorting region setting section 53 sets the sorting region 41 with respect to the standard image displayed in the display region 81 in accordance with the user's instruction from the console 9. The sorting region setting section 53 stores, in the setting data storing section 62, data indicating the position (e.g., a distance from the origin or the detecting point 42 to each of four vertexes, etc.) of each sorting region 41 with respect to the standard region 40. Note that the image processing section 30 may extract a feature of part of the standard image surrounded by the sorting region 41, and store data indicating this feature as the sorting condition in the setting data storing section 62. When a sorting technique without the need for extracting the feature of the sorting region 41 is to be employed, the feature extracting processing performed in advance is omitted.

A sorting condition setting section 63 stores a sorting condition, set by the user operating the edition button 85 for the sorting condition, in the setting data storing section 62. For example, an upper limit and a lower limit of the number of edge pixels or a ratio of edge pixels may be set as the sorting conditions. Since the thresholds such as the upper limit and the lower limit depend on the kind of the inspection target 8 or a peripheral situation of the standard pattern 31, the user may repeat a test or the like to find appropriate values.

The inspection tool selecting section 55 selects the inspection tool to be performed on the inspection target 8 in accordance with the user's instruction inputted through the console 9. The visual inspection section 68 of the image processing section 30 has a variety of inspection tools, but all of those are not always necessary. The user selects the inspection tool to be performed according to the inspection target 8. An inspection region setting section 56 sets a region (inspection region) to be the inspection target by the inspection tool selected by the inspection tool selecting section 55. For example, when a measurement tool for measuring a distance from a first part to a second part of the inspection target 8 is selected, an inspection region surrounding the first part and an inspection region surrounding the second part are set with respect to an image of a product (inspection passed product) to be a standard for the inspection target 8. For example, when a measurement tool for measuring an area of the first part of the inspection target 8 is selected, an inspection region surrounding the first part is set with respect to the image of the product (inspection passed product) to be the standard for the inspection target 8. The inspection threshold setting section 57 sets an inspection threshold to be a reference for making the pass/fail determination on the inspection target 8. For example, when a measurement tool for measuring a distance is selected by the inspection tool selecting section 55, the inspection threshold setting section 57 sets as the inspection threshold a range (tolerance) to be a pass criterion for the distance. The inspection threshold is inputted by the user through the console 9 or the like. These setting data are also stored in the setting data storing section 62, and in the operating mode, the setting data is read by the visual inspection section 68 and used. Note that each inspection region may be associated with the standard region. That is, the position of each inspection region may be previously decided with the position of the standard region taken as a reference. That is, the standard region may also be used as the position correcting region.

In the setting mode, an imaging control section 58 controls the camera 4 and the illuminating device 5 to capture an image of the product (inspection passed product/non-defective product/reference product/model product) to be the standard for the inspection target 8, and stores image data of the standard image in a standard image storing section 60. Further, in the operating mode, the imaging control section 58 controls the camera 4 and the illuminating device 5 to capture the image of the inspection target 8 (uninspected product) to acquire an inspection image, and stores image data of the inspection image in an inspection image storing section 61. A pass/fail determination section 59 compares the result of the visual inspection, received from the visual inspection section 68, with the threshold set by the inspection threshold setting section 57, to make a determination as to whether or not the inspection target 8 present in the inspection image is a non-defective product.

The image processing section 30 also include a variety of functions. A candidate extracting section 64 extracts a feature of the standard pattern 31 from the standard image, and extracts a candidate for the standard pattern 31, similar to the extracted feature, from the inspection image. A candidate sorting section 65 sorts a candidate matching with the sorting condition out of a plurality of candidates extracted from the inspection image. An output section 66 outputs the sorting result to the position/posture deciding section 67, the visual inspection section 68, or the monitor 10.

The position/posture deciding section 67 decides the inspection region of the inspection tool aligned with the position of the sorted candidate. A visual inspection section 68 performs the visual inspection by use of the inspection tool selected by an inspection tool selecting section 55. When just the robot-picking is performed and the visual inspection is not performed, the function concerning the visual inspection may be omitted. In this case, the position/posture deciding section 67 may control the position of the robot-picking based on the position of the candidate.

<Setting Processing>

Figure 10:
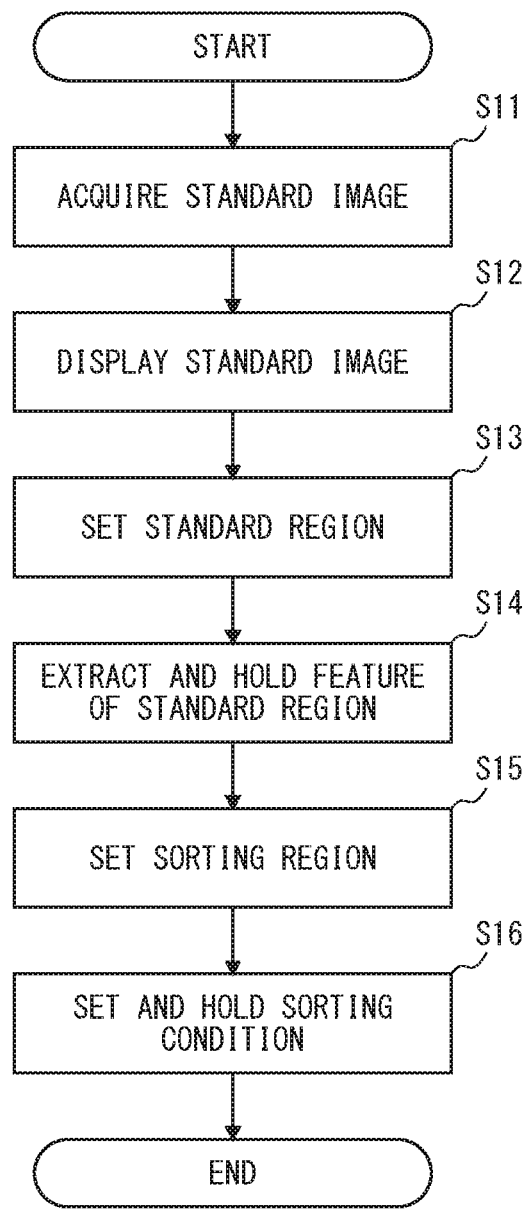
FIG. 10 is a flowchart showing setting processing.

FIG. 10 is a flowchart showing setting processing including a setting for the sorting region 41, and the like. In S11, the CPU 22 (imaging control section 58) controls the camera 4 and the illuminating device 5 to capture an image of the product to be the standard for the inspection target 8, and stores image data of the standard image in the standard image storing section 60. The standard image may only have to be held in the period when the CPU 22 has shifted to the setting mode, but the standard image may be continuously held even in the period when the CPU 22 has shifted to the operating mode. In S12, the CPU 22 (UI control section 50) reads image data of the standard image from the standard image storing section 60, and displays it on the monitor 10 through the display controlling section 28. As described using FIG. 9, the UI control section 50 displays the position correction setting UI 80, and particularly displays the standard image in the display region 81.

In S13, the standard region setting section 52 sets the standard region 40 with respect to the standard image displayed in the display region 81 in accordance with the user's instruction from the console 9. The user sets the standard region 40 so as to surround the standard pattern 31 included in the standard image. The standard region setting section 52 stores, in the setting data storing section 62, a position (e.g., coordinates of four vertexes, coordinates of a detecting point 42, etc.) of the standard region 40 in the standard image. In S14, the image processing section 30 extracts the feature of the standard pattern 31 surrounded by the standard region 40, and stores data indicating the feature in the setting data storing section 62. As described above, S14 may be omitted depending on the search technique.

In S15, the sorting region setting section 53 sets the sorting region 41 with respect to the standard image displayed in the display region 81 in accordance with the user's instruction from the console 9. The position of the sorting region 41 is different according to the application. For example, in the robot-picking, as shown in FIG. 6B, the sorting regions 41 are disposed in a region where a picking section is operated. In the case of the alignment mark, as shown in FIG. 6A, the sorting regions 41 are disposed on the right and left of the alignment mark. In the case of distinguishing the front and the rear of the workpiece, as shown in FIG. 6C, the sorting region 41 is disposed in a portion helpful for distinguishing the front and the rear. The sorting region setting section 53 stores, in the setting data storing section 62, data indicating the position (e.g., a distance from the origin or the detecting point 42 to each of four vertexes, etc.) of each sorting region 41 with respect to the standard region 40. Note that the position of each sorting region 41 may be expressed by a vector. For example, this vector may be a vector indicating a distance and a direction from a reference point of the standard region to a reference point of the sorting region. Further, when the standard region and the sorting region are not restricted to a rectangular shape, shape information indicating the shapes of these regions may be stored.

In S16, the sorting condition setting section 63 stores, in the setting data storing section 62, a sorting condition set by the user operating the edition button 85 for the sorting condition. For example, when an evaluation value is to be used for sorting, a threshold of the evaluation value or the like are set as the sorting condition.

<Positioning Processing>

Figure 11:
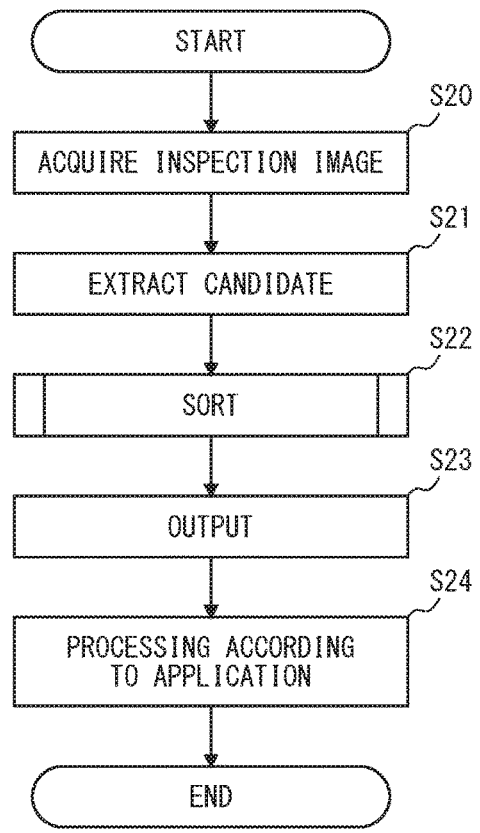
FIG. 11 is a flowchart showing an application including sorting processing.

FIG. 11 is a flowchart showing positioning processing that includes a step of sorting out of a plurality of candidates. In S20, the CPU 22 (imaging control section 58) controls the camera 4 and the illuminating device 5 to capture the image of the inspection target 8 (uninspected product), and stores image data of the inspection image in the inspection image storing section 61. Depending on the application, one inspection image may include a plurality of workpieces, or one inspection image may include one workpiece.

In S21, the image processing section 30 (candidate extracting section 64) searches the feature, extracted from the standard region 40 of the standard image, out of the inspection image to extract a candidate for the standard pattern 31. Hence the position of the candidate for the standard pattern 31 in the inspection image is found. When a correlation value of the standard pattern 31 and the candidates is lower than a predetermined lower limit, such a candidate may be removed.

In S22, the candidate sorting section 65 sorts a candidate matching with the sorting condition out of a plurality of candidates extracted from the inspection image. Note that more detailed specific examples of the sorting processing will be described later by use of FIG. 12 and the like.

In S23, the output section 66 outputs the sorting result to at least one of the position/posture deciding section 67, the visual inspection section 68, and the monitor 10. For example, the output section 66 may provide visually distinguishable marks respectively on the sorted candidate and the unsorted candidate of the plurality of candidates extracted in S21. For example, a red frame may be displayed for the sorted candidate so as to surround the candidate, and a yellow frame may be displayed for the unsorted candidate so as to surround the candidate. Needless to say, some intensified display may be made for the sorted candidate so as to surround the candidate, and such an intensified display may be omitted for the unsorted candidate. The sorting result may include putting up a flag (setting a flag bit to 1) for the sorted candidate, or bringing down a flag (setting a flag bit to 0) for the unsorted candidate. Further, the sorting result may include coordinates indicating the position of the sorted candidate. The reason for displaying the unsorted candidate is because it is helpful in debugging. Whether such a candidate has been rejected based on the threshold of the correlation value, or based on the sorting threshold, is information helpful in debugging. Therefore, displaying the unsorted candidate (the candidate rejected based on the sorting threshold) is useful for a person in charge of debugging.

In S24, the CPU 22 performs processing in accordance with the application by use of the sorting result. For example, the CPU 22 moves the robot hand based on coordinates included in the sorting result, and causes the robot hand to pick up a screw as the sorted candidate. The CPU 22 may move the robot hand based on the coordinates included in the sorting result, and pick a face-up electronic component as the sorted candidate, to position the electronic component in a mountable position on a printed circuit board. Further, the CPU 22 and the position/posture deciding section 67 may dispose the inspection region of the inspection tool in the inspection image according to the coordinates of the alignment mark included in the sorting result, and may perform the visual inspection on the inspection region.

<Sorting Processing>

Figure 12:
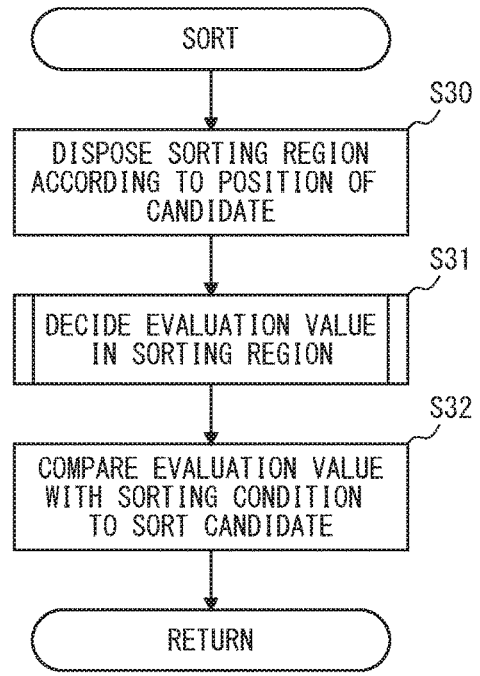
FIG. 12 is a flowchart showing the sorting processing.

FIG. 12 is a flowchart showing several steps that can be included in the sorting processing (S22). Note that when N candidates are found, the sorting processing is performed on each of the N candidates.

In S30, the candidate sorting section 65 disposes the sorting region according to the position of the candidate. At the time when each candidate is found, the position of the standard region 40 of each candidate in the inspection image has been settled. Further, a relative positional relation between the standard region 40 and each sorting region 41 is known, and this is held in the setting data storing section 62. Therefore, the candidate sorting section 65 decides the sorting region 41 concerning each candidate from the position of the standard region 40 of each candidate in the inspection image and from data of the relative positional relation held in the setting data storing section 62.

Figure 13:
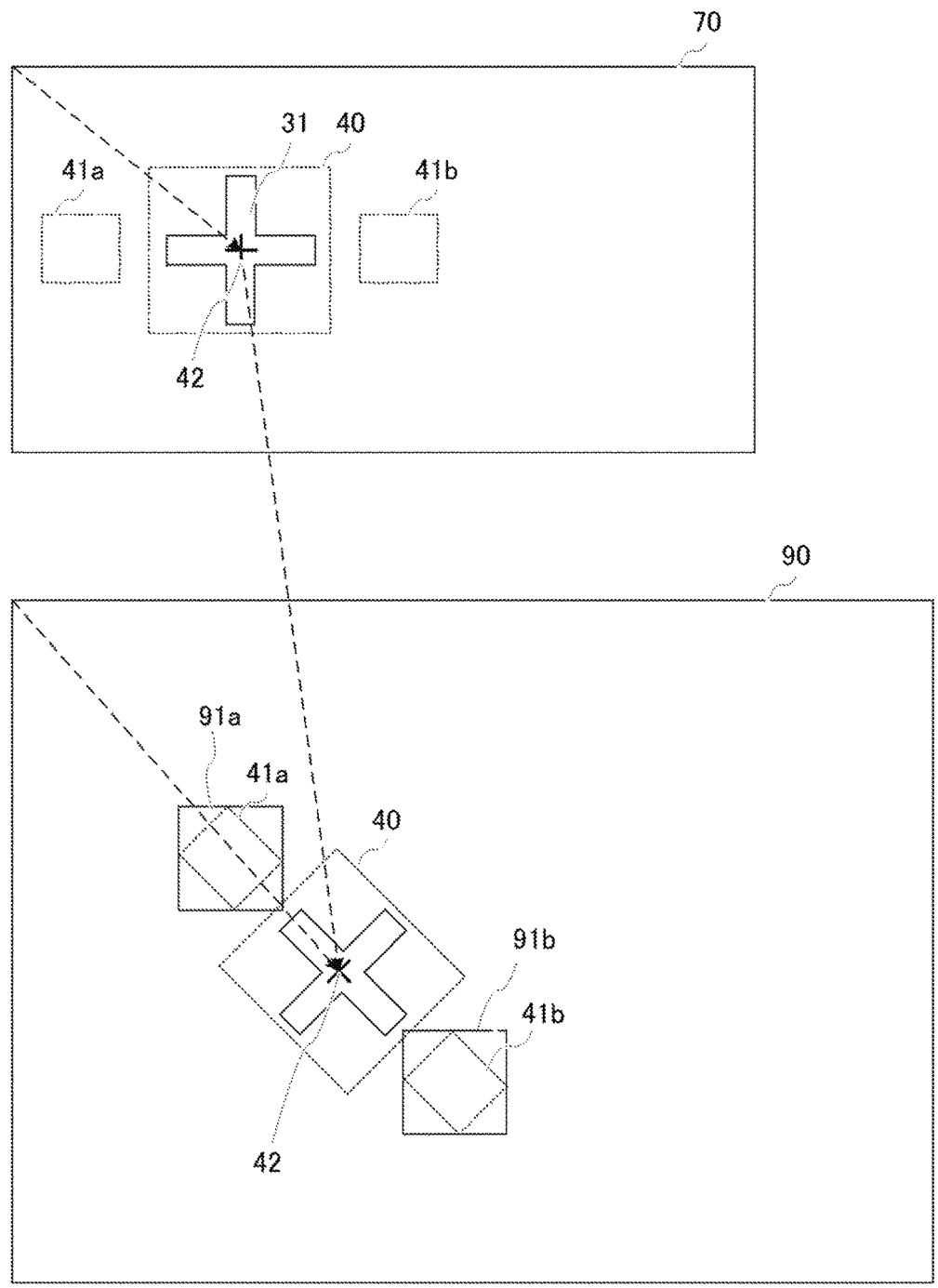
FIG. 13 is a view showing an example of placement of the standard region and the sorting region in an inspection image.

FIG. 13 shows the positional relation between the standard region 40 and each of the sorting regions 41a, 41b in the standard image 70. In the inspection image 90, the position and posture (rotating angle) of the candidate for the standard pattern 31 are often shifted with respect to the standard pattern 31. Thus, the candidate for the standard pattern 31 in the inspection image 90 is found, and the sorting regions 41a, 41b are disposed with respect to the position of the candidate for the standard pattern 31 such that the positional relation between the standard region 40 and each of the sorting regions 41a, 41b is held. For example, a transformation matrix is obtained for transforming the position and the posture of the detecting point 42 set at the center of the standard region 40 to a position and posture of a detecting point in the inspection image 90, and the positions of the sorting regions 41a, 41b are transformed by use of this transformation matrix to decide the positions of the sorting regions 41a, 41b in the inspection image 90. In the transformation matrix, a change in scaling (magnification) may also be considered.

In S31, the candidate sorting section 65 decides an evaluation value concerning the image in the sorting region disposed in the inspection image 90. A technique of deciding the evaluation value will be described using FIG. 14.

In S32, the candidate sorting section 65 compares the sorting condition and the evaluation value obtained from the sorting region as to each of the plurality of candidates, and sorts a candidate having brought the evaluation value that satisfies the sorting condition.

<Method for Deciding Evaluation Value>

There are a large number of indexes that can be employed as evaluation values. For example, the evaluation value relying on the sorting region 41 set with respect to the inspection image 90 includes the number of edge pixels, the ratio of edge pixels, an average pixel value, an average color difference, an edge position, the number of edges, an edge width, and a combination of those. Further, the evaluation value relaying on both the sorting region 41 set with respect to the inspection image 90 and the sorting region 41 in the standard image 70 includes a contrast ratio, a difference in average color, a difference absolute sum, a correlation value; a mutual information amount; and a phase limited correlation value of normalized correlation, a difference in edge position, a difference in edge width, gradation or a distance of a histogram of an edge strength or an edge angle, and a combination of those. Hereinafter, the number of edge pixels and the ratio of edge pixels will be described as an example of the evaluation value.

Figure 14:
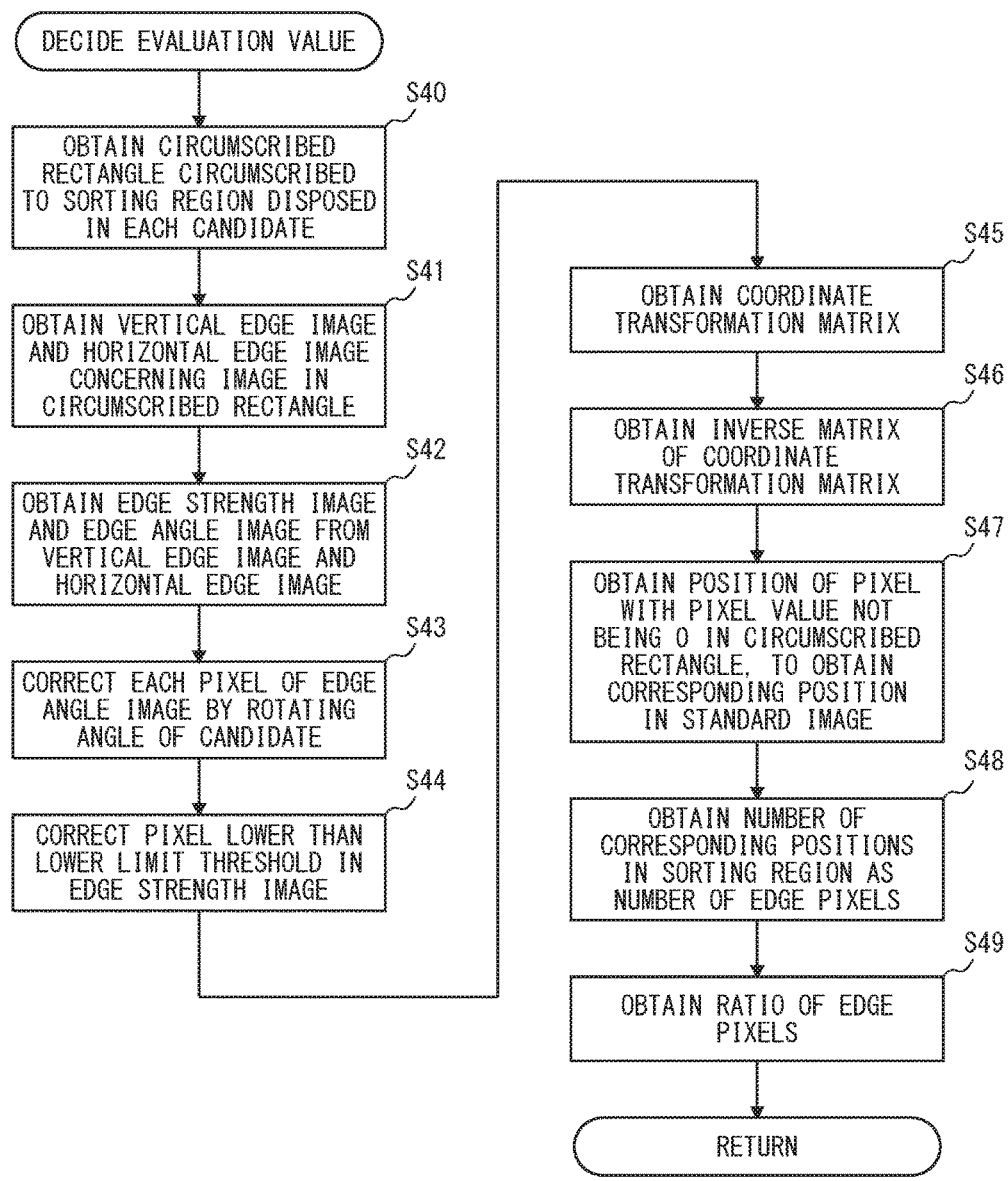
FIG. 14 is a flowchart showing evaluation value deciding processing.

FIG. 14 is a flowchart showing a several steps that can be included in the evaluation value deciding processing (S31). In S40, the candidate sorting section 65 obtains a circumscribed rectangle that is circumscribed to the sorting region 41 disposed with respect to each candidate for the standard pattern 31 in the inspection image 90. According to FIG. 13, a circumscribed rectangle 91a is decided with respect to the sorting region 41a, and a circumscribed rectangle 91b is decided with respect to the sorting region 41b.

In S41, the candidate sorting section 65 obtains a vertical edge image and a horizontal edge image concerning images in the circumscribed rectangles 91a, 91b. For example, the candidate sorting section 65 applies the Sobel filter on the images in the circumscribed rectangles 91a, 91b, to obtain the vertical edge image and the horizontal edge image. In S42, the candidate sorting section 65 obtains an edge strength image and an edge angle image from the vertical edge image and the horizontal edge image. When the processing by direction is to be omitted, generation of an edge angle image is omitted. The circumscribed rectangle is used in order to simplify the processing even when the candidate sorting region has a complicated shape. However, the circumscribed rectangle may not be used and the edge extraction may be performed particularly inside the shape. In this case, S47 described later may be omitted.

In S43, the candidate sorting section 65 corrects each pixel of the edge angle image by the rotating angle of the candidate. A pixel value of each pixel constituting the edge angle image indicates an edge angle. Angles formed by the circumscribed rectangles 91a, 91b and the sorting regions 41a, 41b are the same as an angle formed by the standard pattern 31 in the standard image 70 and the candidate for the standard pattern 31 in the inspection image 90. Each pixel of the edge angle image is corrected by subtracting this rotating angle from each pixel. That is, the edge angle image is corrected by the rotating angle. When each pixel of the edge angle image, corrected by the rotating angle, is not within a predetermined edge angle range, the candidate sorting section 65 may set a pixel value of the pixel in the edge strength image which corresponds to the above pixel to 0. In such a manner, the edge angle image is used for correcting the edge strength image. Correcting the edge strength image using the edge angle image can reduce an influence of noise. That is, the sorting is performed using a feature with directional dependency, thereby reducing an influence of noise with low directional dependency. Note that S43 may be omitted as to an inspection target not required to be subjected to the processing by direction.

In S44, the candidate sorting section 65 corrects a pixel lower than the lower limit threshold in the edge strength image. For example, the candidate sorting section 65 changes a pixel value of a pixel to 0, the pixel being lower than the lower limit threshold in the edge strength image.

In S45, the candidate sorting section 65 obtains a coordinate transformation matrix for transforming the coordinate system of the standard image 70 to the coordinate system of the inspection image 90. For example, the candidate sorting section 65 obtains the coordinate transformation matrix from the coordinates of the detecting point 42 of the standard pattern 31 in the standard image 70 and the coordinates of the detecting point 42 concerning the candidate for the standard pattern 31 in the inspection image 90. In S46, the candidate sorting section 65 obtains an inverse matrix of the coordinate transformation matrix.

In S47, the candidate sorting section 65 obtains a position of a pixel with its pixel value (edge strength) not being 0 in the circumscribed rectangle, to obtain a corresponding position in the standard image. For example, the candidate sorting section 65 performs coordinate transformation by use of an inverse matrix on the position of the pixel with its pixel value not being 0 in the circumscribed rectangle, to obtain the corresponding position in the standard image.

In S48, the candidate sorting section 65 determines whether or not the corresponding position in the standard image is in the sorting region, to obtain the number of corresponding positions in the sorting region as the number of edge pixels. Note that the candidate sorting section 65 may calculate the number of edge pixels standardized by dividing the number of corresponding positions by a square of a scaling value.

In S49, the candidate sorting section 65 obtains the ratio of edge pixels from the number of edge pixels. For example, the candidate sorting section 65 may divide the number of edge pixels by the area of the sorting region 41 to calculate the ratio of edge pixels. In such a manner, the ratio of edge pixels is calculated as the evaluation value.

<Summary>

According to the present embodiment, there is provided a positioning method for searching a previously registered standard pattern out of an inspection target image (inspection image) obtained by capturing an image of the inspection target 8, to position the standard pattern with respect to the inspection target image. Positioning of the standard pattern is, for example, obtaining a position (coordinates, posture, etc.) of the standard pattern in the inspection image, disposing an inspection region for visual inspection with respect to the standard pattern, controlling a position of a grasping section (robot hand) for robot-picking, and the like.

According to S12, there is provided a display step of displaying a standard image of a product to be a standard for the inspection target 8. According to S13, there is provided a setting step of setting a standard region that is a first region so as to surround the standard pattern in the standard image. According to S15, there is provided a setting step of setting a sorting region that is a second region to be a region for sorting a plurality of candidates similar to the standard pattern in the inspection image. According to S21, there is provided an extraction step of searching the standard pattern from the inspection image to extract a plurality of candidates similar to the standard pattern. According to S22, there is provided a sorting step of disposing the sorting region with respect to each of the plurality of candidates for the standard pattern, extracted in the extraction step, to sort a candidate for the standard pattern based on an evaluation value of the sorting region disposed with respect to each of the plurality of candidates for the standard pattern. According to S33, there is provided an output step of outputting a candidate for the standard pattern sorted in the sorting step. As described above, according to the present embodiment, the sorting region is provided separately from the standard region, to thereby allow accurate positioning of a feature portion desired by the user out of the inspection image.

As described concerning S32, the sorting step may include a determination step of determining whether the evaluation value of the sorting region disposed with respect to each of the plurality of candidates for the standard pattern satisfies a predetermined condition. Further, the determination step may include a step of determining whether the evaluation value of the sorting region concerning the plurality of candidates for the standard pattern, extracted from the inspection image, exceeds a threshold. As thus described, the candidates may be narrowed down by use of the threshold related to the number of edge pixels, or the like.

As described concerning S21, the extraction step may include a step of extracting a plurality of candidates similar to the standard pattern based on a correlation value of the standard pattern and the inspection image. For example, the standard pattern is searched in the inspection image while coordinates, a position, a scale (Affine parameters) or the like of the standard pattern is changed with respect to the inspection image, to decide as the candidate a partial image where the correlation value is not smaller than the threshold. The threshold is a lower limit of the correlation value, and may be advantageously used in extracting only a candidate with high search reliability. Note that the evaluation value in the sorting step and the correlation value in the extraction step may be indexes different from each other. For example, a ratio of edge pixels may be used as the evaluation value. The ratio of edge pixels is a robust index with respect to variation in scale, and hence it may be advantageously used in positioning the inspection target 8 with its scale apt to vary. The correlation value may be an index concerning a similarity of a contour (edge) included in the standard region, and the evaluation value may be an index concerning the number of contour pixels (edge pixels) included in the sorting region.

According to S24, there are provided a decision step of deciding a position and a posture of an inspection region of a visual inspection tool that performs visual inspection on the inspection target 8 in line with a position and a posture of the candidate for the standard pattern, and a performing step of performing the visual inspection by use of the visual inspection tool in the inspection region disposed with respect to the inspection target image. According to the present embodiment, since the accuracy in searching the position and posture of the candidate for the standard pattern in the inspection image improves, the accuracy in deciding the position and posture of the inspection region of the visual inspection tool also improves. Eventually, the accuracy in visual inspection also improves.

As described concerning the sorting enabling section 54 and the check box 82 for switching the enablement and disablement of sorting, there may be further provided a selection step of selecting whether or not to perform the sorting step. The selection step may be part of the setting step (S4 of FIG. 3) for the position/posture correction. When performing the sorting step is selected in this selection step, the output step outputs the candidate for the standard pattern, sorted in the sorting step. On the other hand, when not performing the sorting step is selected in the selection step, the output step outputs the candidate for the standard pattern, extracted in the extraction step. It is possible to sufficiently extract the candidate for the standard pattern even in the standard region alone depending on the shape of the standard pattern itself and the shape of the periphery of the standard pattern. In such a case, it may be desirable to omit the sorting step and reduce the processing time taken throughout the positioning method.

As described using FIG. 13 and the like, the sorting region is disposed with respect to each of the plurality of candidates for the standard pattern in the sorting step so as to hold a relative positional relation with respect to the standard region set in the setting step. For example, when the position and posture of the standard region change, the sorting region is decided according to the position and posture of the standard region. Further, when the change in scale is to be considered, the scale of the sorting region is adjusted so as to hold the relative positional relation with respect to the standard region.

As described using FIG. 6A, the standard region may be set so as to surround the alignment mark provided in the inspection target 8, and the sorting region may be set around the alignment mark. On the inspection target 8, the alignment mark may be marked or printed apart from the peripheral shape. In this case, a flat edgeless region extends between the alignment mark and the peripheral shape. On the other hand, the edge may be present around the shape similar to the alignment mark. Thus, a region being around the alignment mark and not having an edge or the like may be taken as the sorting region, to make the alignment mark easily distinguishable from the similar shape. That is, the sorting region may be set around the standard pattern, which is helpful for distinguishing between the standard pattern and the similar shape.

As described using FIG. 6C, the sorting region may be set with respect to the feature for identifying the front surface and the rear surface of the inspection target 8. This allows accurate identification of the front surface and the rear surface of the inspection target 8. Further, in addition to the sorting region for distinguishing the front and the rear, a sorting region for ensuring a grasping region for the robot hand may be simultaneously set. These two sorting regions may each be defined by a plurality of (e.g., four) detached regions.

Note that in principle, the standard region may be defined not by detached regions, and the sorting region may be defined by a plurality of detached regions. For example, the reason the sorting region for grasping by the robot hand is made up of detached regions is because the robot hand has at least two fingers and grasps the inspection target 8 so as to pinch it with those fingers. That is, since the plurality of fingers come into contact with different regions of the surface of the inspection target 8, a plurality of separate contact portions are set as the sorting region.

As described using FIG. 6B, the sorting regions may be disposed around the standard region in order to detect the presence or absence of an obstacle that becomes an obstacle when the inspection target 8 is grasped by the robot handle. When an obstacle is present around the inspection target 8, the robot-picking may fail. Thus, positioning the robot hand with respect to the inspection target 8 with no obstacle present therearound may lead to improvement in robot-picking success ratio.

The foregoing positioning processing and applications may be stored as control programs in the program memory 24. In this case, the CPU 22 and the image processing section 30 each function as a sort of computer, and runs the control program stored in the program memory 24, to perform each step. The image processing section 30 may have a second CPU for running the control program, or the image processing section 30 may be integrated into the CPU 22. Note that the control program may be recorded in a computer readable recording medium and provided.

The foregoing visual inspection apparatus 1 and controller 2 are an example of the positioning apparatus for positioning a standard pattern with respect to an inspection image. The monitor 10 functions as a display unit for displaying a standard image of a product to be a standard for the inspection target 8. The standard region setting section 52 and the sorting region setting section 53 function as a setting unit for setting a standard region so as to surround the standard pattern in the standard image, and setting a sorting region, which is a region for sorting a plurality of candidates similar to the standard pattern in the inspection image. The candidate extracting section 64 functions as an extraction unit for searching the standard pattern from the inspection image to extract a plurality of candidates similar to the standard pattern. The candidate sorting section 65 functions as a sorting unit for disposing the sorting region with respect to the plurality of candidates for the extracted standard pattern, to sort a candidate for the standard pattern based on an evaluation value of the sorting region disposed with respect to each of the plurality of candidates for the standard pattern. The output section 66 functions as an output unit for outputting a candidate for the sorted standard pattern.

The evaluation value has been exemplified by the number of edge pixels and the ratio of edge pixels, but the number of edge pixels by direction may be employed. Further, dispersion of edges in the sorting region 41, a scratch value detected by a scratch inspection unit, or an edge width measured by an edge width measurement unit may be employed.

Further, a feature value calculated from the sorting region in the inspection image may be compared with a feature value calculated from the sorting region for each candidate in the standard image, to narrow down a plurality of candidates into candidates having similar features. As the feature value, there can be employed a difference absolute sum, a mutual information amount, a normalized correlation value, gradation or a distance of a histogram of an edge strength or an edge angle, and the like.

Note that the user may instruct to display all candidates extracted in the extraction step. In this case, the output section may make intensified display for all the candidates for the standard pattern 31 found in the inspection image so as to show that those are the candidates. Further, the output section may distinguish the candidates sorted out of the candidates for the standard pattern 31 found in the inspection image by another intensified display. Moreover, the output section may apply still another intensified display to the best candidate of the sorted candidates. For example, a yellow frame may be displayed for each of the candidates for the standard pattern 31 found in the inspection image, a red frame may be displayed for each of the sorted candidates, and a green frame may be displayed for the best candidate.

The application has been exemplified by detecting the alignment mark, performing the robot-picking, distinguishing the front and the rear, and the like. Naturally, however, the present embodiment can also be employed in other applications. There may be employed an application where a sorting region is provided in a feature section that distinguishes one product type from another, to identify a product type. There may be employed an application where a sorting region is set around one workpiece to detect an overlap of the one workpiece with another workpiece. There may be employed an application where a sorting region is set around a workpiece to detect an overlap of the workpiece with an obstacle. There may be employed an application where a workpiece without a scratch is sorted in a sorting region, or an application where a workpiece with a scratch is removed from a sorting region. There may be employed an application of sorting a workpiece where a tolerance of a size of a portion set in a sorting region is in an allowable range. There may be employed an application where adhesion of a foreign matter is detected in a sorting region, to remove a workpiece with the foreign matter adhering thereto or to sort a workpiece without the foreign matter.

In FIG. 13, a circumscribed rectangle has been defined for each sorting region 41, but a single circumscribed rectangle may be defined for a plurality of sorting regions 41. That is, the smallest rectangle surrounding a plurality of sorting regions 41 may be defined. This may reduce a calculation amount.

What is claimed is:

1. A positioning method for searching a previously registered standard pattern out of an inspection target image obtained by capturing an image of an inspection target, to position the standard pattern with respect to the inspection target image, so as to conduct a pass/fail determination of a product or sorting of a product, wherein the inspection target is the product manufactured in a factory
the method comprising:
a setting step of displaying a standard image of a product to be a standard for the inspection target and setting a first region in the standard image so as to surround the standard pattern in the standard image and a second region in the standard image, the second region being a region for sorting a plurality of candidates similar to the standard pattern in the inspection target image;
a storing step of storing a relative positional relation of the second region with respect to the first region set in the setting step;
an extraction step of searching the standard pattern from the inspection target image, extracting the plurality of candidates similar to the standard pattern from the inspection target image, and deciding the position of the first region corresponding to each of the plurality of candidates;
a sorting step of disposing the second region with respect to each of the plurality of candidates extracted in the extraction step so as to have said relative positional relation with respect to the position of the first region decided in the extraction step, and sorting the plurality of candidates extracted in the extraction step based on an evaluation value of the second region disposed with respect to each of the plurality of candidates for the standard pattern; and
an output step of outputting the desired candidate for the standard pattern based on a sorting result of the sorting step.

2. The positioning method according to claim 1, wherein the sorting step includes a determination step of determining whether the evaluation value of the second region disposed with respect to each of the plurality of candidates for the standard pattern satisfies a predetermined condition.

3. The positioning method according to claim 2, wherein the determination step determines whether the evaluation value of the second region concerning the plurality of candidates for the standard pattern, extracted from the inspection target image, exceeds a threshold.

4. The positioning method according to claim 1, wherein the extraction step includes a step of extracting a plurality of candidates similar to the standard pattern based on a correlation value of the standard pattern and the inspection target image, and the evaluation value in the sorting step and the correlation value in the extraction step are indexes different from each other.

5. The positioning method according to claim 4, wherein the correlation value is an index concerning a similarity of a contour included in the first region, and the evaluation value is an index concerning the number of contour pixels included in the second region.

6. The positioning method according to claim 1, further comprising:
a decision step of deciding a position and a posture of an inspection region of a visual inspection tool that performs visual inspection on the inspection target in line with a position and a posture of the candidate for the standard pattern; and
a performing step of performing the visual inspection by use of the visual inspection tool in the inspection region disposed with respect to the inspection target image.

7. The positioning method according to claim 1, further comprising
a selection step of selecting whether or not to perform the sorting step,
wherein,
when performing the sorting step is selected in the selection step, the output step outputs the candidate for the standard pattern, sorted in the sorting step, and
when not performing the sorting step is selected in the selection step, the output step outputs the candidate for the standard pattern, extracted in the extraction step.

8. The positioning method according to claim 1, wherein the first region is set so as to surround an alignment mark provided on the inspection target, and
the second region is set around the alignment mark.

9. The positioning method according to claim 1, wherein the second region is set with respect to a feature for identifying a front surface and a rear surface of the inspection target.

10. The positioning method according to claim 1, wherein the second region is disposed around the first region in order to detect presence or absence of an obstacle that becomes an obstacle when the inspection target is grasped by a robot handle.

11. The positioning method according to claim 1, wherein the second region is made up of a plurality of detached regions.

12. A non-transitory computer readable recording medium, comprising a computer program which executes the positioning method according to claim 1.

13. A positioning apparatus for searching a previously registered standard pattern out of an inspection target image obtained by capturing an image of an inspection target, to position the standard pattern with respect to the inspection target image, so as to conduct a pass/fail determination of a product or sorting of a product, wherein the inspection target is the product manufactured in a factory
the apparatus comprising:
a setting unit for displaying a standard image of a product to be a standard for the inspection target and setting a first region in the standard image so as to surround the standard pattern in the standard image and a second region in the standard image, the second region being a region for sorting a plurality of candidates similar to the standard pattern in the inspection target image;
a storing unit for storing a relative positional relation of the second region with respect to the first region set by the setting unit;

an extraction unit for searching the standard pattern from the inspection target image, extracting the plurality of candidates similar to the standard pattern from the inspection target image, and deciding the position of the first region corresponding to each of the plurality of candidates;

a sorting unit for disposing the second region with respect to each of the plurality of candidates, extracted by the extraction unit so as to have said relative positional relation with respect to the position of the first region provided by the extraction unit, and sorting the plurality of candidates extracted by the extraction unit based on an evaluation value of the second region disposed with respect to each of the plurality of candidates for the standard pattern; and an output unit for outputting the desired candidate for the standard pattern based on a sorting result of the sorting unit.

* * * * *